C. Rich,

Bed Bottom.

No. 102,867. Patented May 10, 1870.

Half Size.

Half Size.

Half Size.

Witnesses
Z. A. Lassing
E. Elsworth

Inventor
Charles Rich.

United States Patent Office.

CHARLES RICH, OF POUGHKEEPSIE, NEW YORK.

Letters Patent No. 102,867, dated May 10, 1870.

IMPROVEMENT IN THE CONNECTION OF SPRINGS FOR BED-BOTTOMS, SEATS, &c.

The Schedule referred to in these Letters Patent and making part of the same.

*To all whom it may concern:*

Be it known that I, CHARLES RICH, of Poughkeepsie, in the county of Dutchess and State of New York, have invented a new and useful Improvement for Connecting Springs for Beds, and for upholsterer's use; and I do hereby declare that the following is a full, clear, and exact description thereof, reference being had to the accompanying drawings and to the letters of reference marked thereon.

The nature of my invention relates to connecting a series of helical or coiled springs together by means of metallic bands or sleeves, and in packing or lining the said sleeves inside around the bearings of the springs with rubber cloth, or other elastic or flexible material, and thereby making a strong joint, which will move freely, and that without noise, and at the same time hold each spring in its relative position, and in such a manner as to make the springs assist and give strength to each other, without affecting their elasticity.

To enable others skilled in the art to make and use my invention, I will proceed to describe its construction and operation.

In the drawings—

Like letters of reference indicate like parts.

Figure 2:
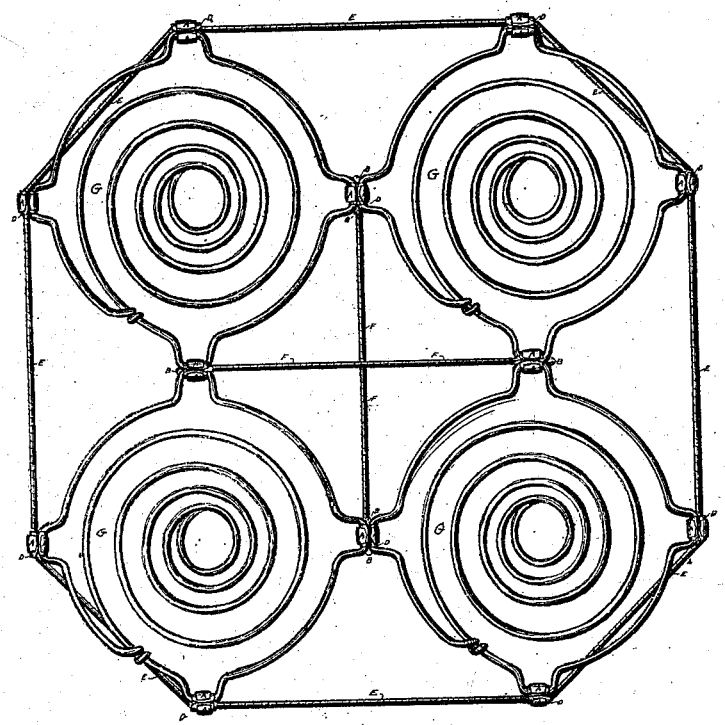
Figure 2 is a top or horizontal section plan view of four springs, taken on the line $x\ x$ in fig. 1, with sleeves, cord, and rubber lining shown.
Figure 3:
Figure 3 is an end view of the sleeve which holds the springs together.

G G are springs made in the common form, except the last turn on each end of the springs, which is provided with four straight bearings formed by straightening the wire at those points, and by making short bends at each end of the bearings, as shown in fig. 2, and as described in my specification, filed February 25th, 1870, for a previous patent.

I arrange these springs in rows, close together, in numbers sufficient to form a bed, sofa, &c.; and so that the bearings of each spring shall be in contact with the bearings of the adjoining springs, and, by means of metallic sleeves A, I fasten all the adjoining bearings of the adjacent springs securely together, and I line the inside of these sleeves with rubber cloth, gutta-percha, or other flexible or elastic substance, which prevents the springs from making a noise; the sleeves A are provided with small ears, B, which prevent the bearings from riding over each other.

It will be seen by folding the springs upon each other that these ears B will strike against the shoulders of the bearings, and prevent them from turning further.

These ears B are of much importance in keeping the sleeves in their proper position, and in keeping the bearings of the springs level.

The sleeves A are also provided with small eyes, C, on the back and outside of said sleeves A. When the sleeves are closed around the bearings of the springs, these eyes come on the inside of the mattress.

Through these eyes C I pass small cords F diagonally from spring to spring, from the top to the bottom of the mattress, both lengthwise and crosswise, as shown.

Figure 1:
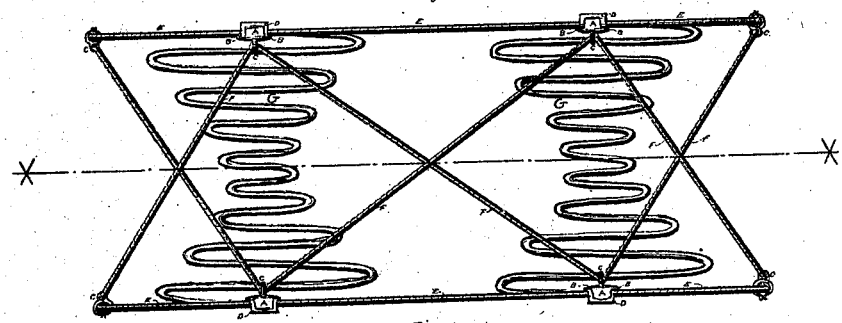
Figure 1 is a side elevation view of two springs with cords and bands or sleeves attached.

These cords cross each other in the center of the mattress, on the line $x\ x$, fig. 1. These cords hold the springs in a perpendicular position, as all the cords are held tightly, except when the springs are under pressure, which are comparatively but a few at the same time.

To the top and bottom bearings on the outside of the outermost rows of spring I secure these sleeves A, and through these sleeves I pass the cord E entirely around the outside of the mattress, at the top and bottom, as shown, and through the eyes of these outside sleeves I lace cord F right and left, from top to bottom of the mattress, as shown, around the entire outside edge of the mattress, crossing at the center on the line $x\ x$, fig. 1.

The packing or lining D I place around the bearings of the springs, inside of the bands or sleeves A, before closing the sleeves together, catching the ends of the lining D in the mouth of the sleeve, as shown.

I arrange springs in rows, crossing said rows at right angles in sufficient numbers to form the desired outline for a mattress, sofa, lounge, &c., and connect them by the bearings at the top and bottom with this sleeve, in the manner shown, which forms a strong, durable, and light elastic mattress, with an entire metallic surface and connections, with no cords or fragile material exposed to the wearing-surface.

These mattresses are adapted to use in any common bedstead without changing either in any particular.

Springs connected in this way do not loose their form by use, nor become bent to one side, as often occurs with springs when secured in any of the ordinary ways for setting springs, as the side, lateral, as well as much of the vertical strain, is distributed over nearly the whole of the entire series.

This principle of connecting springs is applicable to mattresses, bolsters, pillows, beds for steamboats and sleeping-cars, car-cushions, church, hall, and opera-house cushions, sofas, and chairs; and wherever helical or coiled springs in series are used.

These springs may be used either side up, and it is not necessary to secure them to the seats or bedsteads where used; they can be removed, therefore, with facility, and, being perfectly flexible, they may be folded or rolled up for storage or for transportation without fear of injury; for, as soon as released, they will assume their original form.

Having thus described my invention,

What I claim as new, and desire to secure by Letters Patent, is—

1. The ears B upon the sleeves A, when said sleeve or band A is used for connecting coiled springs together, in the manner and for the purposes herein shown and described.

2. The combination and arrangement of the sleeve A with ears B, and eye C with the flexible or elastic lining D, all made and operating substantially as and for the purposes shown and described.

CHARLES RICH.

Witnesses:
 EDWD. ELSWORTH,
 Z. A. LOSSING.